US011595324B1

(12) United States Patent
Batchu et al.

(10) Patent No.: US 11,595,324 B1
(45) Date of Patent: Feb. 28, 2023

(54) SYSTEM FOR AUTOMATED CROSS-NETWORK MONITORING OF COMPUTING HARDWARE AND SOFTWARE RESOURCES

(71) Applicant: BANK OF AMERICA CORPORATION, Charlotte, NC (US)

(72) Inventors: Srinivasa Rao Batchu, Charlotte, NC (US); Haley Anna DeZwaan, Charlotte, NC (US); Pavani Challa, Fremont, CA (US); Parthiban Tiruvayur Shanmugam, Charlotte, NC (US); Mark Anthony Hendricks, Celina, TX (US); Ian Willis Allman, Raleigh, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 36 days.

(21) Appl. No.: 17/492,115

(22) Filed: Oct. 1, 2021

(51) Int. Cl.
*H04L 41/22* (2022.01)
*H04L 9/40* (2022.01)
*H04L 41/28* (2022.01)
*H04L 43/065* (2022.01)
*H04L 43/045* (2022.01)
*H04L 47/80* (2022.01)
*H04L 47/762* (2022.01)
(Continued)

(52) U.S. Cl.
CPC ............ *H04L 47/808* (2013.01); *H04L 41/22* (2013.01); *H04L 41/28* (2013.01); *H04L 43/045* (2013.01); *H04L 43/065* (2013.01); *H04L 47/746* (2013.01); *H04L 47/762* (2013.01); *H04L 47/781* (2013.01); *H04L 63/083* (2013.01)

(58) Field of Classification Search
CPC ........... H04L 41/046–048; H04L 41/16; H04L 41/28; H04L 43/04–067; H04L 43/08–0817; H04L 12/2823–2829; H04L 63/08–108; H04L 63/20; H04L 67/12; G16Y 20/00–40; G16Y 30/00–10; G16Y 40/00–35
See application file for complete search history.

(56) References Cited

U.S. PATENT DOCUMENTS 6,088,451 A * 7/2000 He ...................... H04L 63/0807
709/227
8,468,244 B2  6/2013 Redlich et al.
(Continued)

*Primary Examiner* — Brendan Y Higa
(74) *Attorney, Agent, or Firm* — Moore & Van Allen PLLC; Seongun M. Hong

(57) ABSTRACT

A system is provided for automated cross-network monitoring of computing hardware and software status. In particular, the system may track the status of various computing resources using process automation-based operations to simulate calls made by users to the various resources that the users are authorized to access. Based on said operations, the system may assess whether the authorized pathways to the resources and/or their respective components are properly functioning by capturing information regarding the resource, its associated components, and the current status of the resource. The results of these operations may be aggregated to provide an overview of which resources and/or systems are functioning and which are not. In this way, the system may provide a detailed view of the statuses of the individual resources and components within an entity's complex computing network.

20 Claims, 3 Drawing Sheets

(51) Int. Cl.
*H04L 47/78* (2022.01)
*H04L 47/74* (2022.01)

(56) References Cited

U.S. PATENT DOCUMENTS

| | | | |
|---|---|---|---|
| 8,572,411 B2 | 10/2013 | Ginter et al. | |
| 8,631,456 B2 | 1/2014 | Reisman | |
| 8,635,316 B2 | 1/2014 | Barnhill, Jr. | |
| 8,996,659 B2 | 3/2015 | Werth et al. | |
| 9,111,088 B2 | 8/2015 | Ghai et al. | |
| 9,166,878 B1 * | 10/2015 | Cook | H04L 41/08 |
| 9,456,297 B2 * | 9/2016 | Pi-Sunyer | F24F 11/65 |
| 9,471,380 B2 | 10/2016 | Fellenstein et al. | |
| 9,806,969 B2 * | 10/2017 | Arora | H04L 43/045 |
| 9,832,205 B2 | 11/2017 | Santhi et al. | |
| 10,193,741 B2 | 1/2019 | Zafer et al. | |
| 10,200,267 B2 | 2/2019 | Zafer et al. | |
| 10,411,975 B2 | 9/2019 | Martinez et al. | |
| 10,448,209 B2 | 10/2019 | Reed et al. | |
| 10,554,624 B2 * | 2/2020 | Ott | H04L 63/083 |
| 10,628,582 B2 | 4/2020 | Reybok et al. | |
| 10,757,000 B2 | 8/2020 | Gelvin et al. | |
| 10,880,392 B2 | 12/2020 | Walsh et al. | |
| 11,112,989 B2 | 9/2021 | Richardson | |
| 11,516,069 B1 * | 11/2022 | Satish | H04L 41/0622 |
| 2007/0061460 A1 * | 3/2007 | Khan | H04L 63/029 709/225 |
| 2009/0300164 A1 * | 12/2009 | Boggs | H04L 67/12 709/224 |
| 2010/0228851 A1 * | 9/2010 | Francis | H04L 41/5009 709/224 |
| 2016/0277413 A1 * | 9/2016 | Ajitomi | G06F 21/6209 |
| 2017/0195429 A1 * | 7/2017 | Bokare | H04L 63/00 |
| 2018/0300124 A1 * | 10/2018 | Malladi | G06F 9/542 |
| 2019/0051122 A1 * | 2/2019 | Fulker | H04L 67/125 |
| 2019/0141125 A1 * | 5/2019 | Ogrinz | H04L 67/306 |
| 2019/0251293 A1 * | 8/2019 | Banerjee | G06F 21/6272 |
| 2020/0287790 A1 | 9/2020 | Srinivas et al. | |
| 2020/0287816 A1 | 9/2020 | Chandrasekaran et al. | |
| 2020/0314672 A1 * | 10/2020 | Farooq | H04L 43/0817 |
| 2020/0389469 A1 | 12/2020 | Litichever et al. | |
| 2021/0014275 A1 | 1/2021 | Martinez et al. | |
| 2021/0058399 A1 * | 2/2021 | Kapoor | H04L 63/102 |
| 2021/0067365 A1 | 3/2021 | Ansari et al. | |
| 2021/0099874 A1 * | 4/2021 | Suraparaju | H04W 12/0471 |
| 2022/0200928 A1 * | 6/2022 | Garrison | H04L 41/14 |
| 2022/0209971 A1 * | 6/2022 | Doshi | H04L 9/0637 |
| 2022/0329522 A1 * | 10/2022 | Maciocco | H04L 41/16 |

* cited by examiner

SYSTEM FOR AUTOMATED CROSS-NETWORK MONITORING OF COMPUTING HARDWARE AND SOFTWARE RESOURCES

FIELD OF THE INVENTION

The present disclosure embraces a system for automated cross-network monitoring of computing hardware and software status.

BACKGROUND

There is a need for an efficient and expedient way to monitor the status of computing hardware and software.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for automated cross-network monitoring of computing hardware and software status. In particular, the system may track the status of various computing resources using process automation-based operations to simulate calls made by users to the various resources that the users are authorized to access. Based on said operations, the system may assess whether the authorized pathways to the resources and/or their respective components are properly functioning by capturing information regarding the resource, its associated components, and the current status of the resource. The results of these operations may be aggregated to provide an overview of which resources and/or systems are functioning and which are not. In this way, the system may provide a detailed view of the statuses of the individual resources and components within an entity's complex computing network.

Accordingly, embodiments of the present disclosure provide a system for automated cross-network monitoring of computing hardware and software status, the system comprising a memory device with computer-readable program code stored thereon; a communication device; and a processing device operatively coupled to the memory device and the communication device, wherein the processing device is configured to execute the computer-readable program code to continuously monitor a status of one or more computing resources, wherein the one or more computing resources are associated with a user; retrieve a set of user credentials associated with the user; initiate a connection request to each of the one or more computing resources using the user credentials; based on the connection request, generate a status output for each of the one or more computing resources, wherein the status output indicates a status of each of the one or more computing resources; and aggregate the status output for each of the one or more computing resources to generate a status report associated with the one or more computing resources.

In some embodiments, the computer-readable program code further causes the processing device to: identify, from the status report, a set of malfunctioning computing resources from the one or more computing resources; identify a set of users associated with the set of malfunctioning computing resources; and transmit an alert to the set of users, wherein the alert comprises at least a portion of the status report.

In some embodiments, the alert is transmitted in the form of an e-mail, pop-up notification, or dashboard notification.

In some embodiments, the status output comprises a binary value indicating a reachability of the one or more computing resources, wherein a first binary value indicates that the one or more computing resources is reachable, wherein a second binary value indicates that the one or more computing resources is unreachable.

In some embodiments, the status output comprises the secondary binary value, wherein the status output further comprises an error code indicating a reason for an unreachable status of the one or more computing resources.

In some embodiments, user credentials comprise a username and a password associated with the user.

In some embodiments, the one or more computing resources comprise at least one of hardware resources or software resources.

Embodiments of the present disclosure also provide a computer program product for automated cross-network monitoring of computing hardware and software status, the computer program product comprising at least one non-transitory computer readable medium having computer-readable program code portions embodied therein, the computer-readable program code portions comprising executable portions for continuously monitoring a status of one or more computing resources, wherein the one or more computing resources are associated with a user; retrieving a set of user credentials associated with the user; initiating a connection request to each of the one or more computing resources using the user credentials; based on the connection request, generating a status output for each of the one or more computing resources, wherein the status output indicates a status of each of the one or more computing resources; and aggregating the status output for each of the one or more computing resources to generate a status report associated with the one or more computing resources.

In some embodiments, the computer-readable program code portions further comprise executable portions for identifying, from the status report, a set of malfunctioning computing resources from the one or more computing resources; identifying a set of users associated with the set of malfunctioning computing resources; and transmitting an alert to the set of users, wherein the alert comprises at least a portion of the status report.

In some embodiments, the alert is transmitted in the form of an e-mail, pop-up notification, or dashboard notification.

In some embodiments, the status output comprises a binary value indicating a reachability of the one or more computing resources, wherein a first binary value indicates that the one or more computing resources is reachable, wherein a second binary value indicates that the one or more computing resources is unreachable.

In some embodiments, the status output comprises the secondary binary value, wherein the status output further comprises an error code indicating a reason for an unreachable status of the one or more computing resources.

In some embodiments, the user credentials comprise a username and a password associated with the user.

Embodiments of the present disclosure also provide a computer-implemented method for automated cross-network monitoring of computing hardware and software status, the computer-implemented method comprising continuously monitoring a status of one or more computing resources, wherein the one or more computing resources are associated with a user; retrieving a set of user credentials associated with the user; initiating a connection request to each of the one or more computing resources using the user credentials; based on the connection request, generating a status output for each of the one or more computing resources, wherein the status output indicates a status of each of the one or more computing resources; and aggregating the status output for each of the one or more computing resources to generate a status report associated with the one or more computing resources.

In some embodiments, the computer-implemented method further comprises identifying, from the status report, a set of malfunctioning computing resources from the one or more computing resources; identifying a set of users associated with the set of malfunctioning computing resources; and transmitting an alert to the set of users, wherein the alert comprises at least a portion of the status report.

In some embodiments, the alert is transmitted in the form of an e-mail, pop-up notification, or dashboard notification.

In some embodiments, the status output comprises a binary value indicating a reachability of the one or more computing resources, wherein a first binary value indicates that the one or more computing resources is reachable, wherein a second binary value indicates that the one or more computing resources is unreachable.

In some embodiments, the status output comprises the secondary binary value, wherein the status output further comprises an error code indicating a reason for an unreachable status of the one or more computing resources.

In some embodiments, the user credentials comprise a username and a password associated with the user.

In some embodiments, the one or more computing resources comprise at least one of hardware resources or software resources.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
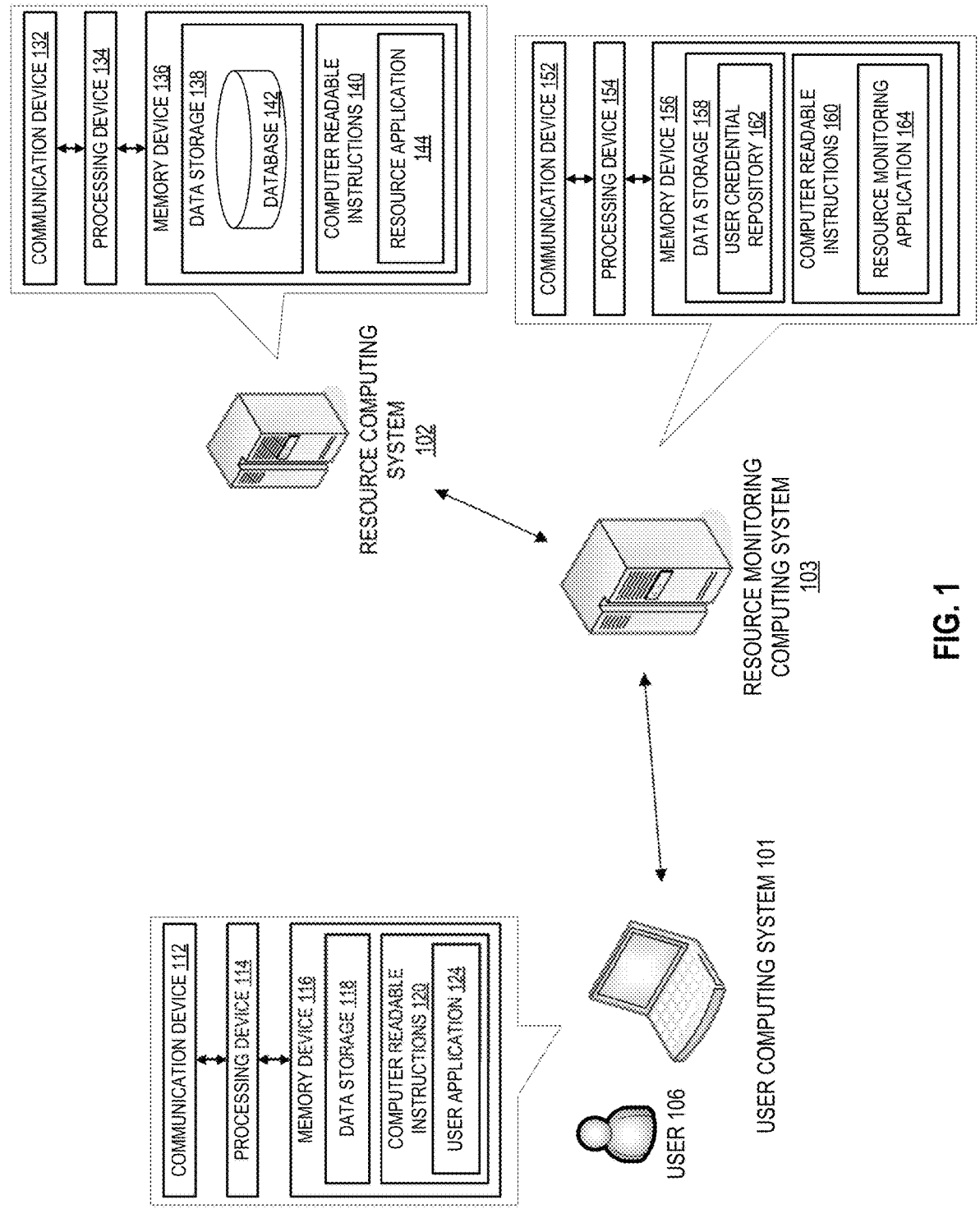
Figure 2:
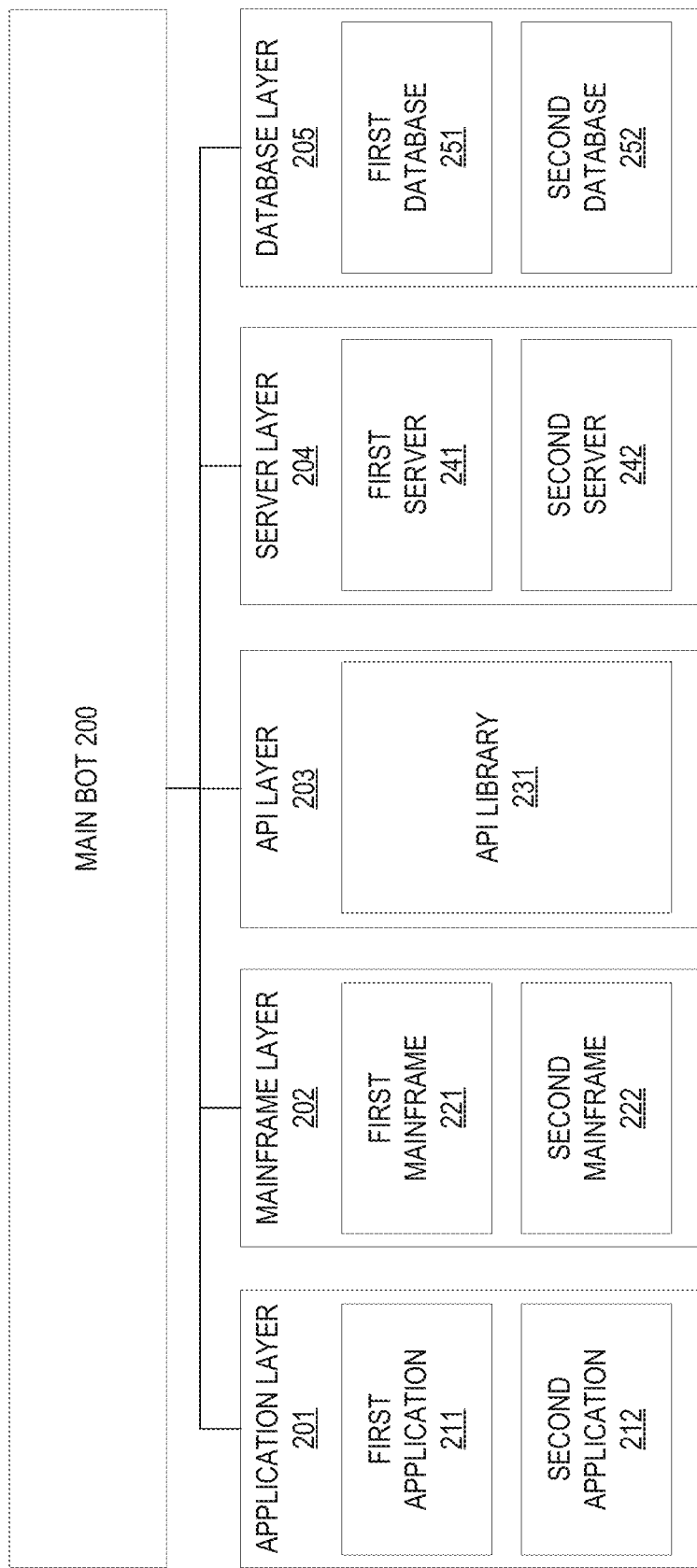
Figure 3:
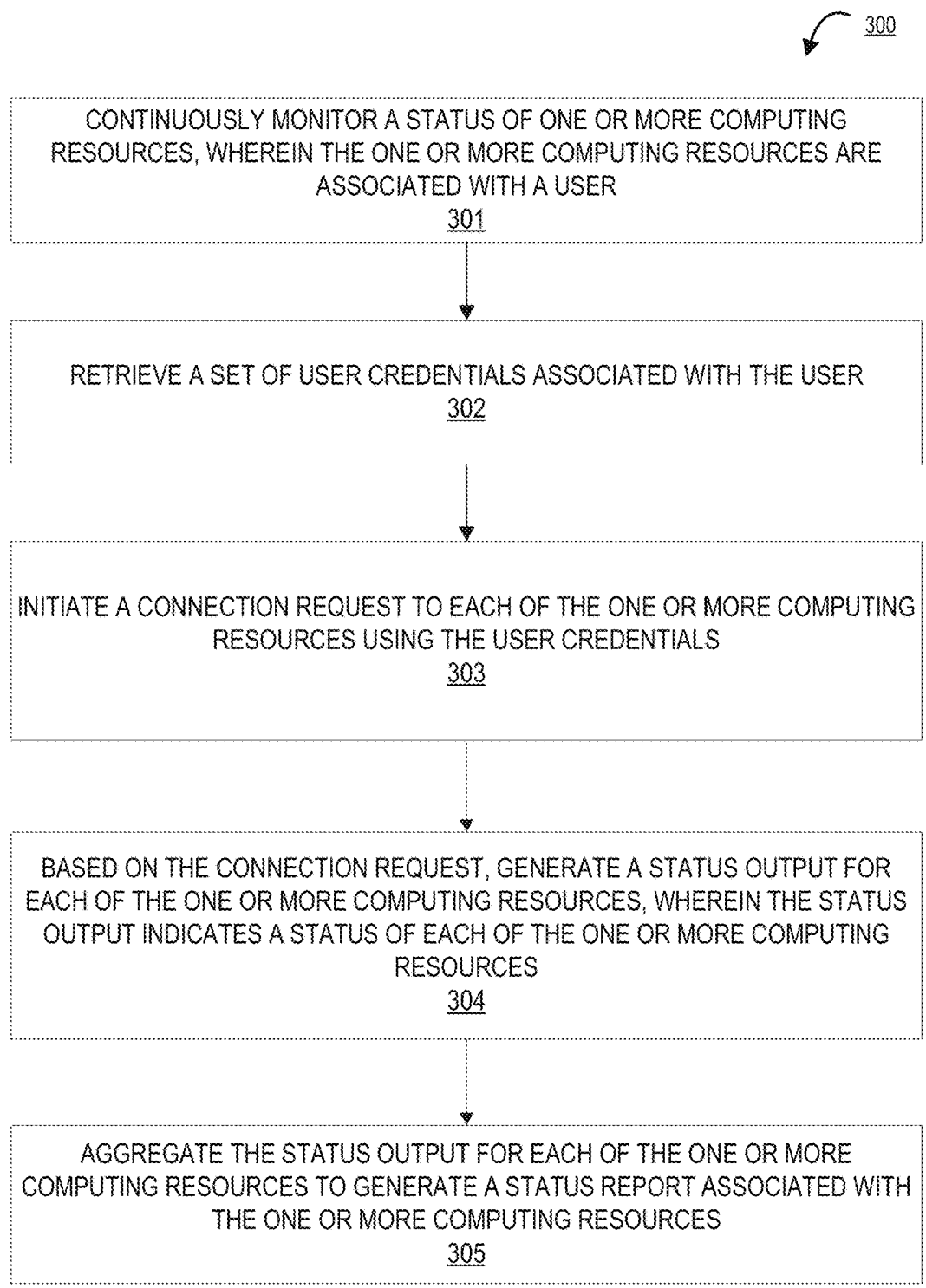

Having thus described embodiments of the invention in general terms, reference will now be made to the accompanying drawings, wherein:

FIG. 1 illustrates an operating environment for the resource status monitoring system, in accordance with one embodiment of the present disclosure;

FIG. 2 is a block diagram illustrating an exemplary status bot architecture for monitoring computing resources, in accordance with one embodiment of the present disclosure; and FIG. 3 is a flow diagram illustrating a process for automated cross-network monitoring of computing hardware and software status, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, "user" as used herein may refer to a computerized resource (e.g., a computing system, application, system process, or the like) that may access other resources as part of its operations.

Accordingly, as used herein the term "user device" or "mobile device" may refer to mobile phones, personal computing devices, tablet computers, wearable devices, and/or any portable electronic device capable of receiving and/or storing data therein.

"Resource" as used herein may refer to tangible or intangible objects which may be held, owned, or used by a user and/or the entity. In particular, "resource" as used herein may refer to computing resources such as hardware (e.g., computing systems, hardware components, servers, wireless smart devices, IoT devices, or the like) and/or software (e.g., applications, operating systems, data repositories, or the like).

"Robotic process automation" or "RPA" as used herein may refer to the automation of high-volume processes using bots.

"Bot" as used herein may refer to a hardware and/or software implemented program that performs automated tasks. In particular, a plurality of bots may be used by an entity to perform various functions for high-volume applications that relate to the entity's objectives. For instance, a bot may be configured to repeatedly perform a specific task. Each bot may be configured to utilize particular protocols and be compatible with particular platforms and applications. In some embodiments, a bot may be configured to execute its tasks by interacting with other applications within the entity's systems at the interface level (e.g., by providing inputs to the interfaces of the other applications).

As an entity's computing network grows in the number of connected devices and resources, the interactions between the various devices and resources become increasingly complex. For instance, an enterprise network environment may comprise thousands of users who may be authorized to access thousands of different computing resources during the course of regular operations. Accordingly, it may be desirable for the entity to monitor the statuses of the various resources within the network environment to ensure that users may continue to access the resources with minimal interruption in workflow.

To address the scenarios described above among others, the present disclosure provides a system for automated cross-network monitoring of computing hardware and software status. Users (which may encompass individuals or automated computing systems or applications) within the network may connect to one or more networked resources (e.g., software or hardware resources) using authentication credentials associated with the user (e.g., a username and password, PIN, biometric data, secure token, or the like). Accordingly, the system may comprise one or more RPA bots (or "status bots") which may be configured to continuously monitor the status of the computing resources within the network. In particular, each status bot may be tasked with monitoring resources that are accessed by a particular set of users. In such cases, the status bot may, at designated time intervals (e.g., every 15 minutes, every hour, or the like), use the authentication credentials of each of the users to attempt to access each of the resources that each of the users are authorized to access. For instance, if user A is authorized to access computing resources B, C, and D, the status bot that has been assigned to user A may attempt to connect to computing resources B, C, and D using the authentication credentials (e.g., a username and password) associated with user A.

After attempting to connect to each of the computing resources, the status bot may generate a status output for each computing resource depending on the outcome of the connection attempt to the specific resource. For instance, if the status bot is able to successfully connect to a computing resource, the status bot may generate a status output of "1" or "yes" for said computing resource to indicate that the resource is accessible (or "healthy"). However, if the status bot encounters an issue in connecting to the resource (e.g., the resource is inaccessible, returns an error, rejects the user authentication credentials, is experiencing latency or responsiveness issues, or the like), the status bot may generate a status output of "0" or "no" for said computing resource to indicate that the resource is experiencing an issue. Each status output may be logged and aggregated by the system to generate a status report of certain users and/or resources within the network.

Using a plurality of status bots in this manner, an entity may be able to automatically and continuously track the statuses of the various computing resources within the network environment (e.g., applications, mainframes, API layers, servers, databases, or the like). The system may recruit a fewer or greater number of status bots depending on the needs of the entity to balance processing workloads. For instance, in one embodiment, the system may comprise a first status bot that checks the status of various applications (e.g., an application status bot), a second status bot that checks the status of the API (e.g., an API status bot), a third status bot that checks the status of servers within the network (e.g., a server status bot), and the like. In other embodiments, the system may use a designated bot on a per user or per resource basis (e.g., a status bot for each application, server, database, or the like within the network environment).

The system may further comprise an intelligent reporting capability which may notify users of any issues that may arise with any of the resources with which the user is associated. In this regard, upon generating the status reports for the resources, the system may generate and transmit live alerts to the users who may be associated with the particular resources. The alerts may be transmitted through one or more communications channels to the user, such as e-mail, SMS, pop-up notifications, dashboard or browser notifications, or the like, and may indicate to the user any alerts or exceptions with respect to the status of a resource. For example, the alert may indicate that a database is inaccessible (e.g., a connection request to the database has timed out). In such embodiments, the alert may indicate the status of the database along with an explanation of the alert (e.g., an error message associated with the database).

In some embodiments, a set of user credentials may be associated with certain restrictions that may limit the manner in which the user access a particular resource. For instance, a certain user credential may be valid only during certain timeframes (e.g., from 9 AM to 9 PM on a particular day) or be valid for only a limited time (e.g., 1 hour after credentials are provided). In such scenarios, the status bot may be configured to perform status checks that conform to the restrictions of the user credentials. For instance, if the user credential is restricted to accessing a resource between the hours of 9 AM to 9 PM, the status bot may perform its status checks during the specified time window and prevent the checks from being performed outside of the window. In this way, the status bot may avoid generating status outputs that may be interpreted as false alarms (e.g., a status output from a status check run at 10 PM would indicate that the resource is inaccessible, which would be expected based on the user credential's time-based restrictions).

An exemplary use case of the system as described herein is provided below. It should be understood that said use case is provided for illustrative purposes only and is not intended to reduce or limit the scope of the disclosure. In one embodiment, the user may be an application that is authorized to access certain resources in the course of its ordinary processes, where the resources may include a database, a server, and an API layer. A status bot that is assigned to the user and/or the specified resources may recall the authentication credentials of the user from a credential database. Upon retrieving the authentication credentials, the status bot may, at regular intervals (e.g., every 15 minutes), attempt to connect to the resources (the database, server, and API layer) using the authentication credentials associated with the user. In this embodiment, the status bot may be able to successfully connect to the database and API layer, and subsequently generate status outputs of "1" for the database and the API layer. However, the status bot may be unsuccessful in connecting to the server (e.g., because the server rejects the user authentication credentials). The status bot may then generate a status output of "0" for the status of the server. In some embodiments, the status bot may further log any errors that may be returned by the server along with the status output associated with the server.

Upon generating the status outputs, the status outputs may be aggregated to generate a report of the statuses of the resources that the user is authorized to access. Furthermore, based on detecting that the server is not accessible by the user, the system may generate and transmit an alert to an appropriate individual or system (e.g., the administrator of the server) regarding the problematic status of the server with respect to the user. In this way, the system may keep the entity apprised of the statuses of its various computing resources.

The system as described herein confers a number of technological advantages over conventional monitoring systems. For instance, by using process automation bots in this manner, the system provides a highly scalable solution to the complex problem of monitoring the moving pieces within a large network environment. Furthermore, by using the intelligent reporting functions described herein, the system may ensure a prompt resolution to any issues that may arise with respect to its computing resources.

Turning now to the figures, FIG. 1 illustrates an operating environment 100 for the resource status monitoring system, in accordance with one embodiment of the present disclosure. In particular, FIG. 1 illustrates a status monitoring computing system 103 in operative communication with a user computing system 101 and resource computing system 102 over a network. In such a configuration, the status monitoring computing system 103 may transmit data to and receive data from computing systems over the network, including the user computing system 101 and/or the resource computing system 102.

It should be understood that FIG. 1 illustrates only an exemplary embodiment of the operating environment 100, and it will be appreciated that the operating environment 100 may comprise fewer or greater numbers of computing systems than what is depicted in FIG. 1. For example, though FIG. 1 depicts a single resource computing system 102, the operating environment may comprise multiple resource computing resources that may comprise hardware and/or software resources to be monitored by the system described herein. It should also be appreciated that one or more functions of the systems, devices, or servers as depicted in FIG. 1 may be combined into a single system, device, or server and/or performed by other computing systems. Furthermore, the functions of a single system, device, or server as depicted in FIG. 1 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the status monitoring computing system 103 may be a computing system that performs monitoring of computing hardware and/or software resources (which may be hosted on the resource computing system 102) through the user credentials associated with the user computing system 101. Accordingly, the status monitoring computing system 103 may comprise a processing device 154 operatively coupled to a communication device 152 and a memory device 156. The memory device 156 may comprise data storage 158 and computer readable instructions 160 stored thereon, where the computer readable instructions 160 may comprise a resource monitoring application 164. The resource monitoring application 164 may, when executed by the processor 154 of the status monitoring computing system 103, cause the processor 154 to perform, using one or more status bots, the resource monitoring, report aggregation, and alert generation/transmission functions as described elsewhere herein.

The data storage 158 of the resource monitoring computing system 103 may comprise a user credential repository 162, which may comprise one or more sets of user credentials to be used in performing the status checks of the computing resources within the network. That said, it should be understood that while the user credential repository 162 is depicted in FIG. 1 as being stored within the data storage 158 of the resource monitoring computing system 103, it is within the scope of the disclosure for the user credential repository 162 to be stored on an external computing system (e.g., a database server) that is in operative communication with the resource monitoring computing system 103 over the network.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

As further illustrated in FIG. 1, the user computing system 101 may be in operative communication with the resource computing system 102 and/or the status monitoring computing system 103. The user computing system 101 may be a computing system owned and/or operated by a user 106, where the user may be an individual who is associated with the entity (e.g., an authorized user on the entity's network). That said, it is within the scope of the disclosure for the user 106 to be a nonhuman user (e.g., an application).

The user 106 may connect to various computing resources within the network (e.g., the resources hosted within the resource computing system 102). Accordingly, the user computing system 101 may comprise a communication device 112, a processing device 114, and a memory device 116. In some embodiments, the user computing system 101 may comprise hardware and/or software components that allow the user computing system 101 to interface with the user 106. In such embodiments, the user computing system 101 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The memory device 116 of the user computing system 101 may further comprise data storage 118 and computer-readable instructions 120 stored thereon. The data storage 118 may have a data artifact 122 stored thereon, where the data artifact 122 may be an artifact that the user 106 has selected for validation and/or evaluation. The computer-readable instructions 120 may comprise a user application 124. The user application 124 may be a software application that the user 106 may use to access certain computing resources within the network. In this regard, the user application 124 may call resources such as other applications, databases, API's, servers, mainframes, and the like.

As further illustrated in FIG. 1, the resource computing system 102 may be a computing system that hosts one or more computing resources to be tracked by the resource monitoring computing system 103. For instance, the resource computing system 102 may host one or more applications, API layers, and/or databases. In other embodiments, the resource computing system 102 itself may be the resource to be tracked by the resource monitoring computing system 103. Accordingly, the resource computing system 102 may comprise a communication device 132, a processing device 134, and a memory device 136, where the processing device 134 is operatively coupled to the communication device 132 and the memory device 136. The processing device 134 uses the communication device 132 to communicate with the network and other devices on the network. As such, the communication device 132 generally comprises a modem, antennae, Wi-Fi or Ethernet adapter, radio transceiver, or other device for communicating with other devices on the network.

The memory device 136 comprises computer-readable instructions 140 and data storage 138, where the computer-readable instructions 140 may have a resource application 144 stored thereon. The resource application 144 may be, for instance, a resource that is accessed as a dependency by the user computing system 101 and/or monitored by the system described herein. In some embodiments, the data storage 138 of the resource computing system 102 may comprise a database 142, where the database 142, like the resource application 144, is a resource that may be accessed by the user computing system 101 and/or monitored by the resource monitoring computing system 103.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic, or other systems that perform various functions of the computing systems. These systems may comprise, for example, electrical circuits, motors, compressors, or any system that enables functioning of the computing systems.

FIG. 2 is a block diagram illustrating an exemplary status bot architecture for monitoring computing resources, in accordance with one embodiment of the present disclosure. In one embodiment, a main bot 200 (which may be a status bot) may be tasked with monitoring the statuses of a specified set of computing resources. The main bot 200, though depicted as a singular unit in FIG. 1, may comprise multiple status bots, where each status bot may be tasked with monitoring at least a subset of resources within one or more resource layers. Accordingly, the main bot 200 may monitor resources within an application layer 201 (which may comprise a plurality of applications 211, 212), mainframe layer 202 (which may comprise a plurality of mainframes 221, 222), API layer 203 (which may comprise an API library 231), server layer 204 (which may comprise a plurality of servers 241, 242), and a database layer 205 (which may comprise a plurality of databases 251, 252).

The main bot 200 may track each of the computing resources within the various layers 201, 202, 203, 204, 205 using the user credentials associated with each of the individual resources. Upon detecting the statuses of each of the resources, the main bot 200 may aggregate the results or outputs of the status checks to generate a report of the statuses of each of the resources that the main bot 200 has been tasked to monitor. In this way, the report provides a convenient way to efficiently perform assessments of even large enterprise networks on which components are functioning properly and which may be malfunctioning. In turn, this provides an efficient way to devise and/or implement remediation processes to address the malfunctioning components.

FIG. 3 is a flow diagram illustrating a process flow 300 for validating data artifacts through an artifact testing platform, in accordance with one embodiment of the present disclosure. The process begins at block 301, where the system continuously monitors a status of one or more computing resources, wherein the one or more computing resources are associated with a user. The computing resources may include hardware and software resources within the network that the user may be authorized to access. For instance, the computing resources may include resources such as applications, mainframes, API's, servers, databases, and the like. Accordingly, the system may track the statuses of such computing resources to confirm whether the resources are functioning properly. In this regard, a status bot may be configured to initiate a status check process at predefined intervals (e.g., in real-time, every 15 minutes, every hour, every day, or the like).

The process continues to block 302, where the system retrieves a set of user credentials associated with the user. The user credentials may include, for instance, a username and password, PIN, secure token, or the like, which may be used by the user to connect to the one or more computing resources that the user is authorized to access. Accordingly, the system may store various user credentials within a user credential repository to be accessed by the status bot in performing its status check operations. In some embodiments, the user credential repository may further contain information (e.g., metadata) about a particular user credential, where the metadata may include certain restrictions on the user credentials. For instance, the restrictions may include time-based restrictions (e.g., time windows, duration limitations, or the like), content-based restrictions (e.g., restrictions on the type of data that may be accessed within a database, the functions that may be accessed within an application, or the like), or other types of restrictions. In such embodiments, the status bot may perform its status checks in accordance with the restrictions. For instance, if a set of user credentials contains a time window based restriction (e.g., the user credentials are only valid during a particular time window), the status bot may, upon reading the metadata associated with the user credentials, perform its status checks with said user credentials only during the particular time window.

The process continues to block 303, where the system, initiates a connection request to each of the one or more computing resources using the user credentials. Each set of user credentials may be associated with one or more computing resources. Accordingly, a status bot may proceed through the list of user credentials until the status bot has connected (or attempted to connect) to each of the computing resources associated with each of the user credentials. In some embodiments, the status bot may be manually configured to connect to certain resources using specified user credentials. In this respect, the system may further allow for the configuration of custom rules regarding the status check that a status bot performs with a particular set of credentials. For instance, the custom rules may include status check frequency (e.g., set the status checks to run every other day), time-based restrictions, content-based restrictions, or the like. In other embodiments, the status bot may continuously monitor the user credential repository for new user credential data. Once new user credential data is detected, the status bot may pull the new user credentials (along with associated metadata) from the user credential repository to automatically configure the status checks for the new user credentials.

The process continues to block 304, where the system generates a status output for each of the one or more computing resources, wherein the status output indicates a status of each of the one or more computing resources. In some embodiments, the status output may be a binary value (e.g., 1 or 0) that may indicate that the resource is reachable or unreachable. For instance, a status of 1 may indicate that the resources is functioning properly (e.g., the status bot was able to successfully connect to the resource using the user credentials), while a status of 0 may indicate that the resource is failing to function properly (e.g., the status bot has encountered an issue in connecting to the resource using the user credentials). A resource that fails to function properly may be unreachable (e.g., unavailable on the network), be experiencing service quality issues (e.g., network or computing latency, low memory, or the like), return an error, or otherwise fail to respond to the connection request sent by the status bot. In such scenarios, the status output may further comprise an error code indicating the reason for the unreachable status of the computing resource. The status bot may log the status outputs for each of the computing resources to be used in the following step.

The process concludes at block 305, where the system aggregates the status output for each of the one or more computing resources to generate a status report associated with the one or more computing resources. The report may comprise a list of computing resources along with each of their associated statuses. In this regard, the list may be presented in one or more styles (e.g., a table, diagram, chart, or the like), thereby providing an overview of which computing resources are functioning properly and which are not.

In some embodiments, the system may further be configured to identify, from the report, a set of malfunctioning computing resources within the one or more computing resources (e.g., resources with a status of 0). The system may then identify a set of users associated with the malfunctioning resources and subsequently transmit an alert to the set of users, where the alert may include at least a portion of the report. The alert may be transmitted to the set of users in a number of ways, including e-mail, SMS, pop-up notifications, dashboard alerts, or the like. In this way, the system may provide alerts to the relevant users when an exception is encountered by the status bots, which in turn allows the users to take various remediation steps to correct the malfunctions of the resources in a timely manner.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for automated cross-network monitoring of computing hardware and software status, the system comprising:
 a memory device with computer-readable program code stored thereon;
 a communication device; and
 a processing device operatively coupled to the memory device and the communication device, wherein the processing device is configured to execute the computer-readable program code to:
  continuously monitor a status of one or more computing resources, wherein the one or more computing resources are associated with a user;
  retrieve a set of user credentials associated with the user;
  initiate a connection request to each of the one or more computing resources using the user credentials;
  based on the connection request, generate a status output for each of the one or more computing resources, wherein the status output indicates a status of each of the one or more computing resources; and
  aggregate the status output for each of the one or more computing resources to generate a status report associated with the one or more computing resources.

2. The system according to claim 1, wherein the computer-readable program code further causes the processing device to:
 identify, from the status report, a set of malfunctioning computing resources from the one or more computing resources;
 identify a set of users associated with the set of malfunctioning computing resources; and
 transmit an alert to the set of users, wherein the alert comprises at least a portion of the status report.

3. The system according to claim 2, wherein the alert is transmitted in the form of an e-mail, pop-up notification, or dashboard notification.

4. The system according to claim 1, wherein the status output comprises a binary value indicating a reachability of the one or more computing resources, wherein a first binary value indicates that the one or more computing resources is reachable, wherein a second binary value indicates that the one or more computing resources is unreachable.

5. The system according to claim 4, wherein the status output comprises the secondary binary value, wherein the status output further comprises an error code indicating a reason for an unreachable status of the one or more computing resources.

6. The system according to claim 1, wherein the user credentials comprise a username and a password associated with the user.

7. The system according to claim 1, wherein the one or more computing resources comprise at least one of hardware resources or software resources.

8. A computer program product for automated cross-network monitoring of computing hardware and software status, the computer program product comprising at least one non-transitory computer readable medium having computer-readable program code portions embodied therein, the computer-readable program code portions comprising executable portions for:

continuously monitoring a status of one or more computing resources, wherein the one or more computing resources are associated with a user;

retrieving a set of user credentials associated with the user;

initiating a connection request to each of the one or more computing resources using the user credentials;

based on the connection request, generating a status output for each of the one or more computing resources, wherein the status output indicates a status of each of the one or more computing resources; and aggregating the status output for each of the one or more computing resources to generate a status report associated with the one or more computing resources.

9. The computer program product of claim 8, wherein the computer-readable program code portions further comprise executable portions for:

identifying, from the status report, a set of malfunctioning computing resources from the one or more computing resources;

identifying a set of users associated with the set of malfunctioning computing resources; and transmitting an alert to the set of users, wherein the alert comprises at least a portion of the status report.

10. The computer program product of claim 9, wherein the alert is transmitted in the form of an e-mail, pop-up notification, or dashboard notification.

11. The computer program product of claim 8, wherein the status output comprises a binary value indicating a reachability of the one or more computing resources, wherein a first binary value indicates that the one or more computing resources is reachable, wherein a second binary value indicates that the one or more computing resources is unreachable.

12. The computer program product of claim 11, wherein the status output comprises the secondary binary value, wherein the status output further comprises an error code indicating a reason for an unreachable status of the one or more computing resources.

13. The computer program product of claim 8, wherein the user credentials comprise a username and a password associated with the user.

14. A computer-implemented method for automated cross-network monitoring of computing hardware and software status, the computer-implemented method comprising:

continuously monitoring a status of one or more computing resources, wherein the one or more computing resources are associated with a user;

retrieving a set of user credentials associated with the user;

initiating a connection request to each of the one or more computing resources using the user credentials;

based on the connection request, generating a status output for each of the one or more computing resources, wherein the status output indicates a status of each of the one or more computing resources; and aggregating the status output for each of the one or more computing resources to generate a status report associated with the one or more computing resources.

15. The computer-implemented method of claim 14, wherein the computer-implemented method further comprises:

identifying, from the status report, a set of malfunctioning computing resources from the one or more computing resources;

identifying a set of users associated with the set of malfunctioning computing resources; and transmitting an alert to the set of users, wherein the alert comprises at least a portion of the status report.

16. The computer-implemented method of claim 15, wherein the alert is transmitted in the form of an e-mail, pop-up notification, or dashboard notification.

17. The computer-implemented method of claim 14, wherein the status output comprises a binary value indicating a reachability of the one or more computing resources, wherein a first binary value indicates that the one or more computing resources is reachable, wherein a second binary value indicates that the one or more computing resources is unreachable.

18. The computer-implemented method of claim 17, wherein the status output comprises the secondary binary value, wherein the status output further comprises an error code indicating a reason for an unreachable status of the one or more computing resources.

19. The computer-implemented method of claim 14, wherein the user credentials comprise a username and a password associated with the user.

20. The computer-implemented method of claim 14, wherein the one or more computing resources comprise at least one of hardware resources or software resources.

* * * * *